No. 891,224. PATENTED JUNE 16, 1908.
W. E. HINDS.
CULTIVATOR FOR DESTROYING COTTON BOLL WEEVILS.
APPLICATION FILED MAR. 18, 1908.
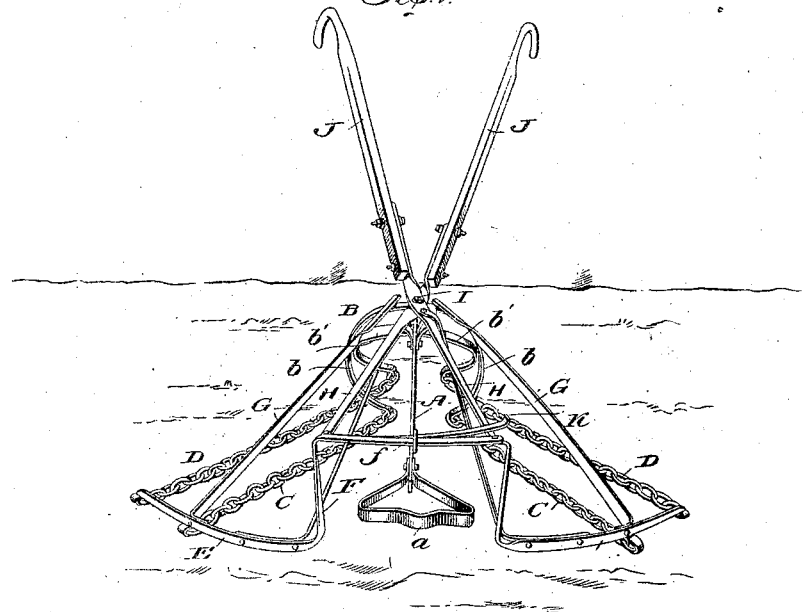
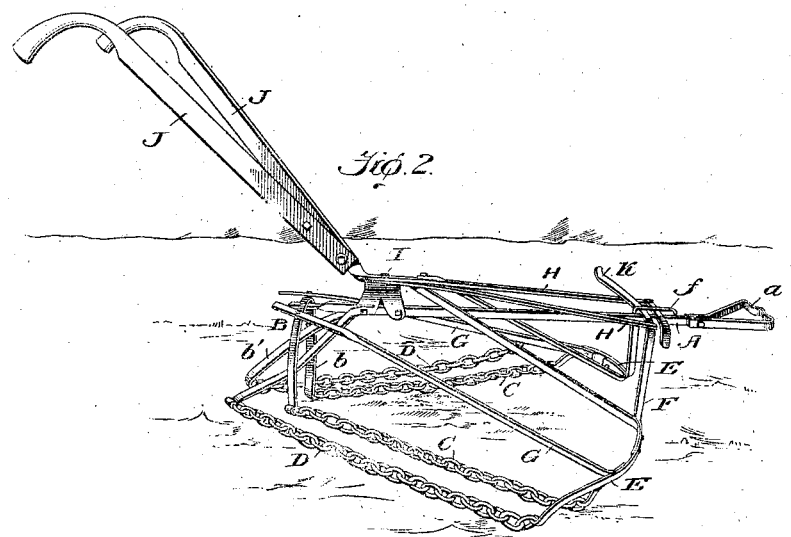
Witnesses
Warren Elmer Hinds   Inventor
By 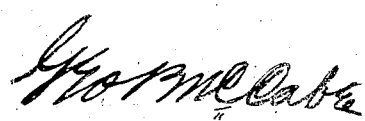
Attorney

UNITED STATES PATENT OFFICE.

WARREN ELMER HINDS, OF AUBURN, ALABAMA.

CULTIVATOR FOR DESTROYING COTTON-BOLL WEEVILS.

No. 891,224.

Specification of Letters Patent.

Patented June 16, 1908.

Application filed March 18, 1908. Serial No. 421,954.

(DEDICATED TO THE PUBLIC.)

*To all whom it may concern:*

Be it known that I, WARREN ELMER HINDS, a citizen of the United States, residing at Auburn, in the county of Lee and State of Alabama, (whose post-office address is Auburn, in the said county and State,) have invented a new and useful Improvement in a Cultivator for Destroying Cotton-Boll Weevils, of which the following is a specification.

This application is made under the act of March 3, 1883, chapter 143 (22 Stat., 625), and the invention herein described and claimed may be used by the Government of the United States or any of its officers or employees in the prosecution of work for the Government, or by any person in the United States, without the payment to me of any royalty thereon.

This invention relates to cultivators and more especially to machines or devices for cultivating cotton, the object being to provide a comparatively simple, inexpensive and efficient device for securing the exposure of the major portion of the fallen cotton forms, which may contain stages of the weevil, to the heat of the sun. It has been ascertained that, if the air temperature, as recorded by ordinary thermometers, exceeds 85 degrees F., the temperature at the surface of the dry ground in the direct sunshine will be sufficiently high to be unfavorable to weevil development with the probability that a considerable percentage of stages will perish before reaching maturity. If the air temperature reaches 95 degrees F., then the temperature at the dry soil will be about 120 degrees F., which is fatal to nearly, if not quite, all weevil stages within twenty-four hours.
At 95 degrees F., air temperature, the temperature on the surface of the soil in the sunshine is about 130 degrees F., and at 100 degrees F. air temperature, the temperature on the ground is about 140 F. The last two mentioned temperatures are fatal to all weevil stages within a few hours, even to those in squares and small bolls which have been freshly picked from the plants so that they do not become dry before the weevil stage dies. If the soil is moist at the surface the temperature is greatly reduced, so that the temperature in the sunshine does not exceed the air temperature by more than 10 degrees F. Temperature at the surface of the soil in the shade of the plants does not exceed the air temperature by more than 10 degrees F. This excess is not sufficient to produce any great mortality among the weevils, even at high temperatures, either on dry soil in the shade of the plants or in the exposed portions of the paths on wet or moist soil.

By use of the cultivator hereinafter described and claimed, the condition in which the soil is left is theoretically and practically perfect.

The nature, characteristics and scope of the invention will be more readily understood from the following description taken in connection with the accompanying drawing, forming a part hereof, wherein Figure 1 is a front perspective view of the machine; Fig. 2 is a side perspective view thereof.

Referring to the drawing, A represents the draft bar, and *a* is its complemental loop to receive the bow. Secured to the draft bar at the rear thereof is an arch B to permit the passage of the debris. The arch is formed by spring frames *bb'*, to the ends of which are secured chains C, D. The chains diverge towards the front of the machine where they are secured to the front guard E, having a yoke as F, which passes through a keeper *f* on the draft bar. There are adjusting bars as G disposed intermediate the arch B and the front guard, the purpose of which is to tighten the chains. There are adjusting bars H extending from the front guard rearwardly to a point on the draft bar where they are pivoted as at I and arranged to be operated by the handles, J, for the purpose of adjusting the width of the machine. A slide K governs the opening and closing of the front of the machine.

By putting the aforesaid described cultivator into practical operation, the heavy chains attached thereto make it possible to secure a thorough and uniform cultivation of the surface of the soil for a uniform depth over the entire space between the rows of the cotton crop, and the machine is so regulated that the said chains pass over the soil very close to the cotton plant, thereby producing an action which induces a complete moving or drawing of the fallen cotton forms, that may be infested with boll weevil, from under the plants out into the space along the middle of the paths where they will be adequately exposed to the sunshine and its fatal effects upon the weevil. This method reverses the usual tendency of action of the cultivators in ordinary use, which throw the fallen cotton forms under the edge of each plant toward the base of the cotton plant, so that after cultivation the forms lie still nearer the base and consequently in the shade, where they are more protected from the sunshine than they were previous to the cultivation. The depth of stirring the soil will vary according to its condition, but such depth, in any event, will always be shallow. Cultivation by the use of said machine will leave an even dust mulch over the surface of the ground about one and one-half inches in depth, which will serve to prevent the cracking of the ground and thus better conserve the moisture in the soil and promote the growth and fruiting of the cotton plants during the dry seasons.

Having described the nature and objects of the invention, I claim—

1. In a cultivator, a draft bar, an arch at the rear thereof to permit the passage of debris, a front guard, and drag chains interposed between the arch and guard.

2. In a cultivator, a draft bar, an arch at the rear thereof to permit the passage of debris, a front guard, drag chains interposed between the arch and guard, and means for tightening the chains.

3. In a cultivator, a draft bar, front and rear frames, drag chains supported thereby and diverging toward the front of the machine, means for tightening the chains and means for regulating the width of the machine.

4. In a cultivator, a draft bar, front and rear frames, drag chains supported thereby and diverging toward the front of the machine, means for tightening the chains, and pivotal members for regulating the width of the machine.

In testimony whereof I affix my signature in the presence of two subscribed witnesses.

WARREN ELMER HINDS.

Witnesses:
R. S. MACKINTOSH,
P. F. WILLIAMS.